(12) United States Patent
Liu et al.

(10) Patent No.: US 12,493,785 B2
(45) Date of Patent: Dec. 9, 2025

(54) METHOD, ELECTRONIC DEVICE, AND COMPUTER PROGRAM PRODUCT FOR DEPLOYING MACHINE LEARNING MODEL

(71) Applicant: EMC IP Holding Company LLC, Hopkinton, MA (US)

(72) Inventors: Jinpeng Liu, Shanghai (CN); Jin Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1046 days.

(21) Appl. No.: 17/129,222

(22) Filed: Dec. 21, 2020

(65) Prior Publication Data

US 2022/0172044 A1 Jun. 2, 2022

(30) Foreign Application Priority Data

Nov. 27, 2020 (CN) .......................... 202011364629.6

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | | |
|---|---|---|---|---|
| 10,698,737 B2 * | 6/2020 | Fachini | ................. | G06N 3/063 |
| 11,159,628 B1 * | 10/2021 | Gupta | .................... | G06N 20/00 |
| 11,301,762 B1 * | 4/2022 | Chen | ....................... | G06N 5/027 |
| 11,416,289 B2 | 8/2022 | Liu et al. | | |
| 11,461,291 B2 | 10/2022 | Liu et al. | | |
| 11,507,419 B2 | 11/2022 | Li et al. | | |
| 11,579,924 B2 | 2/2023 | Li et al. | | |
| 11,915,154 B2 | 2/2024 | Liu et al. | | |
| 2017/0124451 A1 * | 5/2017 | Barham | ................. | G06N 20/00 |
| 2019/0324810 A1 | 10/2019 | Zhao et al. | | |
| 2019/0391796 A1 * | 12/2019 | Brady | ..................... | G06F 8/458 |
| 2020/0334083 A1 | 10/2020 | Liu et al. | | |
| 2020/0334544 A1 | 10/2020 | Liu et al. | | |
| 2020/0387818 A1 * | 12/2020 | Chan | ....................... | G06F 17/18 |
| 2021/0034582 A1 | 2/2021 | Liu et al. | | |

(Continued)

OTHER PUBLICATIONS

Moskewicz et al, Boda: A Holistic Approach for Implementing Neural Network Computations, ACM International Conference on Computing Frontiers 2017, May 2017. (Year: 2017).*

(Continued)

*Primary Examiner* — Marshall L Werner (74) *Attorney, Agent, or Firm* — Ryan, Mason & Lewis, LLP (57) ABSTRACT

Embodiments of the present disclosure relate to a method, an electronic device, and a computer program product for deploying a machine learning model. The method includes: acquiring a machine learning model in accordance with an open neural network exchange format; converting the machine learning model to an intermediate representation using a multi-level intermediate representation method; and deploying a computation associated with the machine learning model to at least one computing device using the intermediate representation.

20 Claims, 4 Drawing Sheets

(56) References Cited

U.S. PATENT DOCUMENTS

| | | | |
|---|---|---|---|
| 2021/0240525 A1 | 8/2021 | Liu et al. | |
| 2021/0248002 A1 | 8/2021 | Li et al. | |
| 2021/0303344 A1 | 9/2021 | Li et al. | |
| 2022/0012607 A1 | 1/2022 | Liu et al. | |
| 2022/0092439 A1 | 3/2022 | Liu et al. | |
| 2022/0101194 A1 | 3/2022 | Liu et al. | |
| 2022/0343165 A1* | 10/2022 | Hu | G06N 3/045 |
| 2023/0102562 A1* | 3/2023 | Ding | G06F 8/41 |
| | | | 717/146 |

OTHER PUBLICATIONS

Tavarageri et al., Automatic Model Parallelism for Deep Neural Networks with Compiler and Hardware Support, Jun. 2019. (Year: 2019).*

Jin et al., Compiling ONNX Neural Network Models Using MLIR, Oct. 2020. (Year: 2020).*

Lattner et al., MLIR: A Compiler Infrastructure for the End of Moore's Law, Mar. 2020. (Year: 2020).*

Wikipedia, "Intermediate Representation," https://en.wikipedia.org/w/index.php?title=Intermediate_representation&direction=next&oldid=905361000, Jan. 24, 2020, 4 pages.

Jia et al., "Beyond Data and Model Parallelism for Deep Neural Networks," Proceedings of the 2nd SysML Conference, Palo Alto, CA, Jul. 2018, 13 pages.

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," arXiv:1901.02067v1, Jan. 7, 2019, 13 pages.

Github, "OpenNESS Architecture and Solution Overview," https://github.com/open-ness/specs/blob/master/doc/architecture.md, accessed Jul. 7, 2020, 15 pages.

Amazon Web Services, "Machine Learning Inference with AWS IoT Greengrass Solution Accelerator" https://aws.amazon.com/iot/solutions/mli-accelerator/, Oct. 2019, 5 pages.

Y. Huang et al., "GPipe: Efficient Training of Giant Neural Networks using Pipeline Parallelism," arXiv:1811.06965v5 [cs.CV], Jul. 25, 2019, 11 pages.

D. Narayanan et al., "PipeDream: Generalized Pipeline Parallelism for DNN Training," The 27th ACM Symposium on Operating Systems Principles, Huntsville, Ontario, Canada, Oct. 27-30, 2019, 15 pages.

LLVM, "The LLVM Compiler Infrastructure," https://llvm.org/, Accessed Jul. 10, 2020, 3 pages.

LLVM, "Multi-Level Intermediate Representation Overview," https://mlir.llvm.org/, Accessed Jul. 10, 2020, 3 pages.

ONNX, "Open Neural Network Exchange," https://onnx.ai/, 2019, 3 pages.

Github, "ONNX: Open Standard for Machine Learning Interoperability," https://github.com/onnx/onnx, Accessed Jul. 10, 2020, 8 pages.

Github, "ONNX: Operators.md at Master," https://github.com/onnx/onnx/blob/master/docs/Operators.md, Accessed Jul. 10, 2020, 233 pages.

Github, "ONNX Runtime: Cross-Platform, High Performance ML Inferencing and Training Accelerator," https://github.com/microsoft/onnxruntime, Accessed Jul. 10, 2020, 10 pages.

Github, "LLVM Project: MLIR at Master," https://github.com/llvm/llvm-project/tree/master/mlir, Accessed Jul. 10, 2020, 2 pages.

C. Li et al., "Benanza: Automatic uBenchmark Generation to Compute "Lower-bound" Latency and Inform Optimizations of Deep Learning Models on GPUs," arXiv:1911.06922v3, Feb. 19, 2020, 11 pages.

* cited by examiner

METHOD, ELECTRONIC DEVICE, AND COMPUTER PROGRAM PRODUCT FOR DEPLOYING MACHINE LEARNING MODEL

RELATED APPLICATION(S)

The present application claims priority to Chinese Patent Application No. 202011364629.6, filed Nov. 27, 2020, and entitled "Method, Electronic Device, and Computer Program Product for Deploying Machine Learning Model," which is incorporated by reference herein in its entirety.

FIELD

Embodiments of the present disclosure generally relate to the field of artificial intelligence, and in particular, to a method, an electronic device, and a computer program product for deploying a machine learning model.

BACKGROUND

In recent years, with the advancement of artificial intelligence technology, machine learning or deep learning (DL) has promoted the development of many fields. At the same time, machine learning models have become more and more complex and require larger and larger data sets. Therefore, the execution of such a machine learning model requires more computing resources. With the development of technologies, edge nodes have played a significant role in providing such computing resources. An edge node is typically a business platform built on a network edge side close to a user. Edge nodes can provide storage, computing, networking, and other resources so that certain critical business applications can be deployed at an access network edge to reduce the bandwidth and latency losses caused by network transmission and multi-level forwarding.

A machine learning model can be deployed on edge nodes. However, due to the limitations of computing resources and storage resources of edge nodes, there are problems with the deployment of a machine learning model on edge nodes, such as the inability to be universal for multiple machine learning models, difficulties in scheduling a computation associated with the machine learning model, and a large number of repetitive parameters occupying the storage resources of the edge nodes. In this case, not only the efficiency and effectiveness of the deployment of the machine learning model will be affected, but also the execution efficiency of the computation of the machine learning model will be affected, which in turn affects the user experience associated with the machine learning model.

SUMMARY

Embodiments of the present disclosure provide a method, an electronic device, and a computer program product for deploying a machine learning model.

In a first aspect of the present disclosure, a method for deploying a machine learning model is provided. The method includes: acquiring a machine learning model in accordance with an open neural network exchange format; converting the machine learning model to an intermediate representation using a multi-level intermediate representation method; and deploying a computation associated with the machine learning model to at least one computing device using the intermediate representation.

In a second aspect of the present disclosure, an electronic device is provided. The electronic device includes: at least one processing unit; and at least one memory which is coupled to the at least one processing unit and stores instructions for execution by the at least one processing unit, wherein the instructions, when executed by the at least one processing unit, cause the device to perform actions including: acquiring a machine learning model in accordance with an open neural network exchange format; converting the machine learning model to an intermediate representation using a multi-level intermediate representation method; and deploying a computation associated with the machine learning model to at least one computing device using the intermediate representation.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

This Summary is provided in order to introduce the selection of concepts in a simplified form, which will be further described in the Detailed Description below. The Summary is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by the following Detailed Description of example embodiments of the present disclosure, to be viewed in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Hereinafter, illustrative embodiments of the present disclosure will be described in more detail with reference to the accompanying drawings. Although the illustrative embodiments of the present disclosure are illustrated in the drawings, it should be understood that the present disclosure can be implemented in various forms and should not be limited by the embodiments set forth herein. Rather, these embodiments are provided to make the present disclosure more thorough and complete, and to enable the scope of the present disclosure to be conveyed completely to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" means "at least one further embodiment." The terms "first," "second," and the like, may refer to different or the same objects. Other explicit and implicit definitions may also be included below.

A deep learning framework for machine learning technology has three components at runtime, namely, a compiler front end, a compiler back end, and an executor. The compiler front end compiles a program associated with a machine learning model into a static or dynamic computation graph, and generates an associated intermediate representation for representing the generated computation graph. Based on the generated computation graph, the compiler back end generates code for a scheduler and kernel computation. The executor will execute the code for the scheduler in a main central processing unit so as to perform deep learning computations.

It can be seen that in the runtime of the deep learning framework, only the compiler front end is actually associated with deep learning. Once the compiler front end compiles the program associated with the machine learning model into the computation graph and the deep learning intermediate representation, the compiler back end and the scheduler are not related to the specific knowledge of the deep learning field.

In addition, in a deep learning network computing model that is used for reasoning, some parameters will not be changed during the reasoning, and the size of dynamic data flowing between some layers of the deep learning network computing model is much smaller than the size of the parameters. Thus, in practice, these parameters can be reused for all input samples of the deep learning network computing model.

In conventional solutions, most deep learning frameworks are originally designed to train models in clouds. Although some deep learning frameworks are also designed for reasoning, they are designed for single usage rather than being involved in performing reasoning on streaming and continuous inputs. At the same time, these two frameworks are implemented with a front end, a back end, and a scheduler, wherein the front end, the back end, and the scheduler are blended and closely integrated, even though only the front end is associated with the deep learning network and algorithm. Therefore, the deep learning framework in conventional technologies has many shortcomings.

In conventional deep learning frameworks, end users must switch between different frameworks during a life cycle of an application. Since front ends, such as an application programming interface and a model format, and back ends, such as a supported computing device, of the frameworks are not open to programmers, users of such frameworks must switch between different frameworks. For example, they must use a dedicated processing unit such as a graphics processing unit (GPU) as an accelerator to train a model in one framework, then convert this pre-trained model to another framework, and finally deploy it to yet another framework for reasoning. However, due to the existence of a large number of neural network models and a large number of edge nodes or Internet of Things devices, such a process will be very time-consuming and inefficient.

In such deep learning frameworks, there is no parallel computation in reasoning at all. This is because all frameworks are using data parallelism to accelerate model training. The reason why data parallelism can work is that during training, the entire dataset will be divided into mini-batches, and each mini-batch will be trained on a different computing node, and the gradient will be exaggerated when different mini-batches are in different trainings. This means that for a single computing node, the computation of the samples are actually performed one by one, and there is no parallel computation between them. However, as described above, for reasonings performed in edge nodes, each reasoning is performed based on a single sample from streaming inputs, and such samples are uncorrelated with one another. Therefore, there is no data parallelism.

In such case, users cannot customize a computation plan. This is because the front end, the back end, and the scheduler are closely linked, so it is not easy for the users to customize the scheduler to organize computations more efficiently using, for example, model parallelism or pipelined parallelism rather than data parallelism.

At the same time, the users cannot schedule computations in different computing devices. For example, the framework usually needs to specify, for computations, a target device such as a central processing unit, a dedicated processing unit, or other accelerators; otherwise, the framework will automatically select a target device for the users. Once the target device is specified, the framework will perform all computations in that device, even if some computations are not suitable for such devices. For example, a filling computation copies only some pixels of an image from some storage locations to other storage locations. If such computation is performed in a main memory of a central processing unit, it will be more efficient. However, once a dedicated processing unit is specified, this framework will blindly perform filling on the dedicated processing unit anyway.

In addition, users cannot optimize the movement of parameters. For example, reasoning applications on edge nodes will typically perform network computations on streaming inputs. This means that some model parameters can be kept in a memory of an accelerator device to optimize performance for reasonings from different input samples. However, in some implementations of a current framework, for each computation, a scheduler will copy fixed parameters from a central processing unit to a dedicated processing unit before performing the computation in the device, and copy the computation result from the dedicated processing unit back to the central processing unit after the computation. In some other implementations of the current framework, inputs and outputs of a function will always be kept in a dedicated processing unit to avoid the movement of parameters between a central processing unit and the dedicated processing unit. However, for the first type of implementations, the movement of parameters will take a long time, and in the worst case scenario, it may be necessary to copy the computation result from the dedicated processing unit back to the central processing unit and immediately copy it from the central processing unit back to the dedicated processing unit. For the second type of implementations, if certain parameters are not used for a long time, very valuable memories of dedicated processing units may be wasted, and in some cases, a model may be too large to be put into a single dedicated processing unit or a single computing node.

In order to at least partially address the above problems and one or more of other potential problems, the embodiments of the present disclosure provide a solution for deploying a machine learning model. This solution includes techniques for building an open and dynamic reasoning deep learning framework on edge nodes. This framework can accept any model from any framework for deployment to any target device like, for example, a central processing unit, a dedicated processing unit, a dedicated accelerator such as a field programmable gate array and an application specific integrated circuit, and can leverage open and mature building blocks in the industry to dynamically change the parallelism, the movement of parameters, and the scheduling of execution of computation across accelerators. To summarize, with an open front end, the framework can accept any model pre-prepared by any framework, and will support additional accelerators from any provider. With a customized and more flexible scheduler, the framework will allow heavier deep learning tasks to be customized to infrastructure configurations with higher performance.

In the embodiments of the present disclosure, edge nodes are illustrated as an example, but the protection scope of the present disclosure is not limited thereto; instead, it may be applied to a variety of computing nodes capable of providing computing services.

Figure 1:
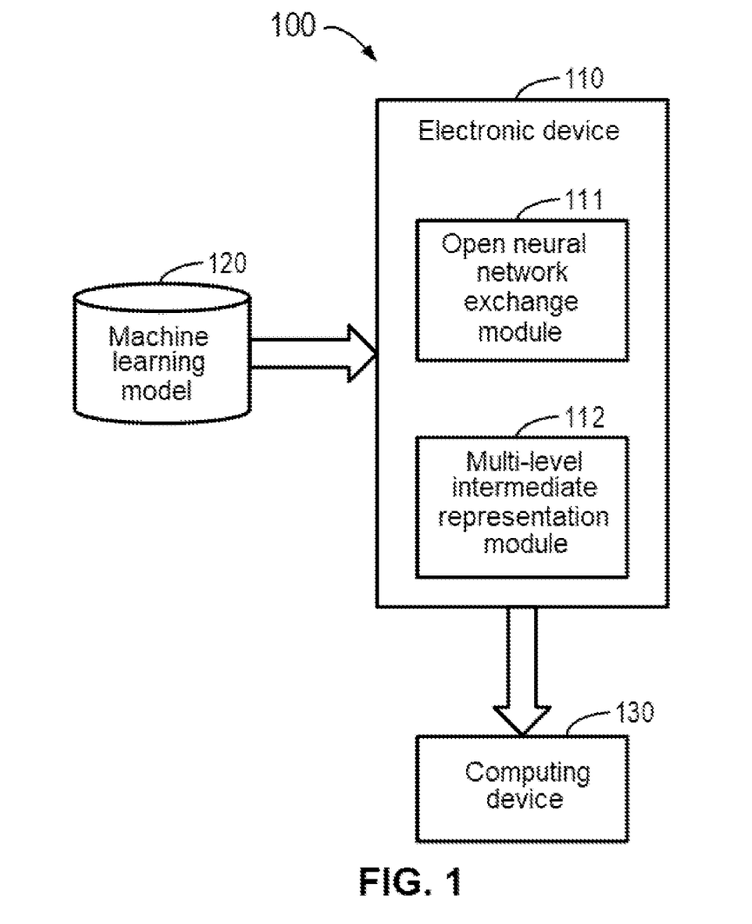
FIG. 1 illustrates a schematic diagram of example environment 100 in which devices and/or methods according to embodiments of the present disclosure may be implemented.

FIG. 1 illustrates a schematic diagram of example environment 100 in which devices and/or methods according to embodiments of the present disclosure may be implemented. According to an embodiment of the present disclosure, example environment 100 in FIG. 1 includes electronic device 110 having open neural network exchange module 111 and multi-level intermediate representation module 112, machine learning model 120, and computing device 130. Electronic device 110 may include any device, unit, module, or system, etc. that has computing power and is capable of supporting the operations of open neural network exchange module 111 and multi-level intermediate representation module 112.

In example environment 100 in FIG. 1, machine learning model 120 is input as an input to electronic device 110. Electronic device 110 then processes machine learning model 120 through open neural network exchange module 111 and multi-level intermediate representation module 112 included therein to determine a computation that needs to be deployed and is associated with machine learning model 120. Afterwards, electronic device 110 deploys the determined computation to computing device 130.

It should be understood that example environment 100 is only illustrative and not restrictive, and it is extensible. For example, example environment 100 may include a greater number of machine learning models 120 as inputs and a greater number of electronic devices 110, thereby enabling more efficient implementation of the technical solution of deploying a machine learning model of the present disclosure using the greater number of electronic devices 110, for the greater number of machine learning models 120 by means of, for example, parallel computations and distributed computations. In addition, computing device 130 may include multiple computing devices, so that electronic device 110 can deploy the computation associated with machine learning model 120 to the multiple computing devices.

In example environment 100 in FIG. 1, data transmission and communication such as inputs from machine learning model 120 to electronic device 110 and the deployment of the computation associated with machine learning model 120 by electronic device 110 to computing device 130 may be performed over a network.

Figure 2:
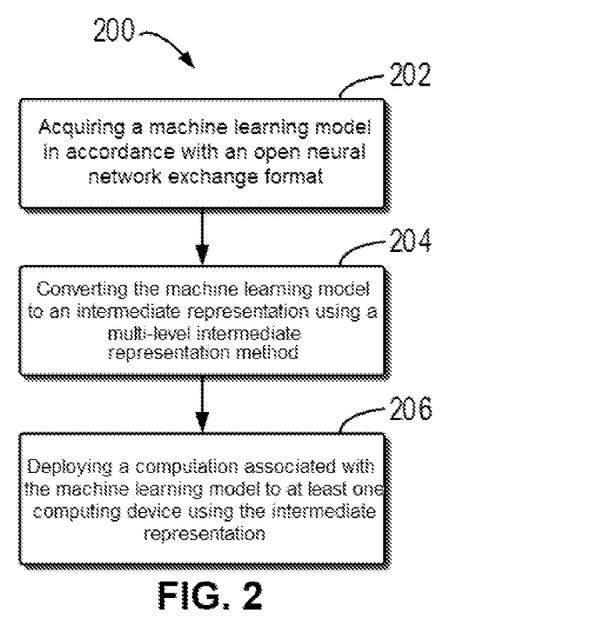
FIG. 2 illustrates a flowchart of method 200 for deploying a machine learning model according to an embodiment of the present disclosure.

FIG. 2 illustrates a flowchart of method 200 for deploying a machine learning model according to an embodiment of the present disclosure. Method 200 may be implemented by electronic device 110 shown in FIG. 1 or by other appropriate devices. It should be understood that method 200 for deploying a machine learning model may also include additional steps not shown and/or may omit the steps shown, and the scope of the embodiments of the present disclosure is not limited in this regard.

In block 202, electronic device 110 uses open neural network exchange module 111 included therein to acquire machine learning model 120 in accordance with an open neural network exchange format. According to an embodiment of the present disclosure, with open neural network exchange module 111 used as a front end, any machine learning model from any framework can be accepted in accordance with the open neural network exchange format. Open neural network exchange module 111 defines a group of common computational application programming interfaces, building blocks of machine learning and deep learning models, and a common file format to enable developers of artificial intelligence to use models with a variety of frameworks, tools, runtime, and compilers. Open neural network exchange module 111 works as a translator. Its front end can convert models and computational application programming interfaces defined in one framework into its internal model format and computational application programming interfaces, and its back end can convert its internal model format and computation application programming interfaces into models and computational application programming interfaces. Therefore, a model defined in one framework can be converted and used in another framework. However, since open neural network exchange module 111 does not have a compiler back end as in a conventional machine learning framework, it is used as a front end in the framework of the present disclosure.

In block 204, electronic device 110 uses multi-level intermediate representation module 112 included therein to convert machine learning model 120 received in block 202 to an intermediate representation by means of a multi-level intermediate representation method. According to an embodiment of the present disclosure, multi-level intermediate representation module 112 may include a library of representation formats and compiler utilities, which is located between a model representation and a low-level compiler or executor that generates hardware-specific code, and can be used to generate hardware-specific code. By defining other intermediate representations in other deep learning frameworks as dialects, multi-level intermediate representation module 112 is actually open. By implementing predefinitions in multi-level intermediate representation module 112, new intermediate representations can be integrated into multi-level intermediate representation module 112, and then tools and libraries generated by multi-level intermediate representation module 112 can be utilized.

In block 206, electronic device 110 deploys a computation associated with machine learning model 120 to computing device 130 using the intermediate representation converted in block 204. According to an embodiment of the present disclosure, multi-level intermediate representation module 112 is integrated into a low-level virtual machine. The low-level virtual machine can include a collection of modular and reusable compilers and tool-chain technologies, and its back end can be used to generate code for all popular target devices. Therefore, electronic device 110 can implement the deployment of the computation associated with machine learning model 120 to computing device 130 by using the intermediate representation converted in block 204 to generate code for computing device 130 that is used as a target device and deploying the code to computing device 130.

According to an embodiment of the present disclosure, the open neural network exchange format can be transformed into a multi-level intermediate representation format, and code for the multi-level intermediate representation format can be generated via a low-level virtual machine. In addition, users can also customize a back end to generate code for their dedicated accelerators such as a field programmable gate array and an application specific integrated circuit. Therefore, according to an embodiment of the present disclosure, computing device 130 may include at least one of the following: a central processing unit, a dedicated processing unit, and a dedicated accelerator such as a field programmable gate array and an application specific integrated circuit.

Figure 3:
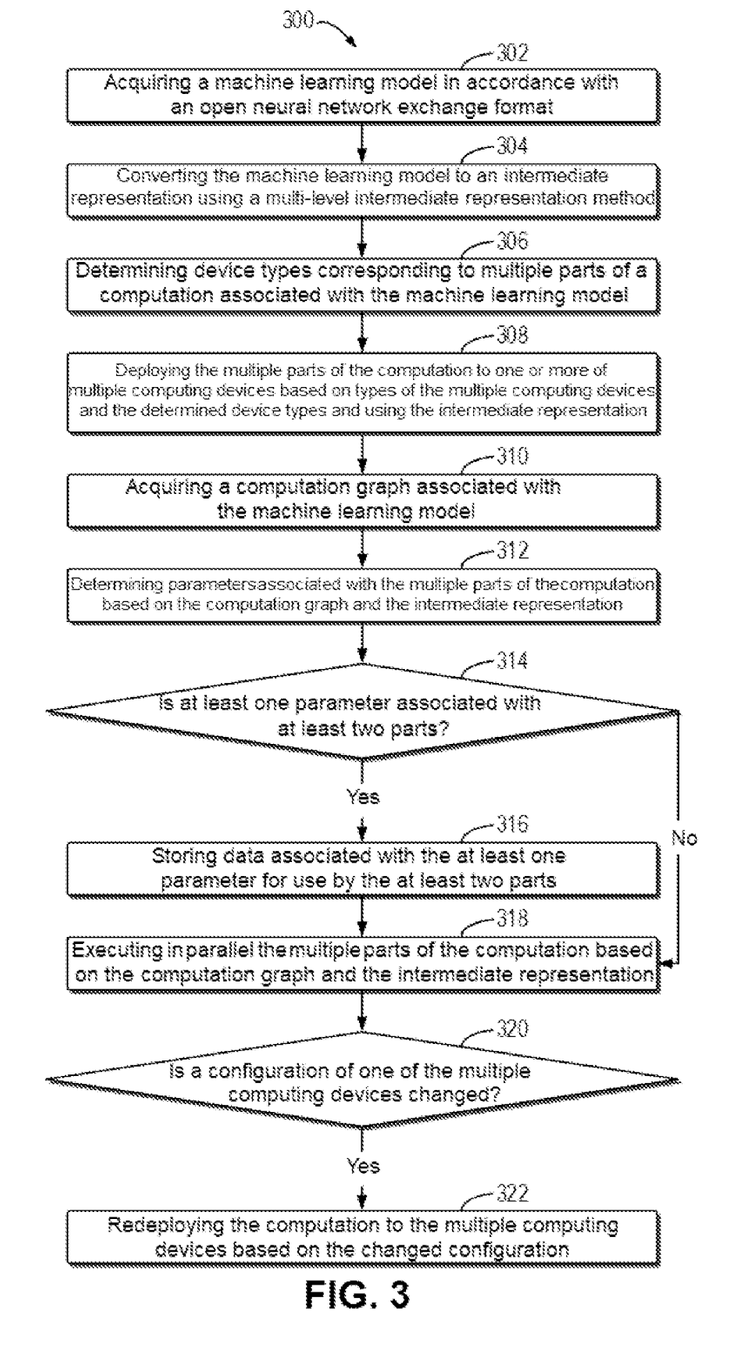
FIG. 3 illustrates a flowchart of method 300 for deploying a machine learning model according to an embodiment of the present disclosure.

FIG. 3 illustrates a flowchart of method 300 for deploying a machine learning model according to an embodiment of the present disclosure. Method 300 may also be implemented by electronic device 110 shown in FIG. 1 or by other appropriate devices. It should be understood that method 300 for deploying a machine learning model may also include additional steps not shown and/or may omit the steps shown, and the scope of the embodiments of the present disclosure is not limited in this regard. Method 300 for deploying a machine learning model is a specific implementation of method 200 for deploying a machine learning model.

In block 302, electronic device 110 uses open neural network exchange module 111 included therein to acquire machine learning model 120 in accordance with an open neural network exchange format. The specific content of this action involved in block 302 is the same as that involved in block 202, and will not be repeated here.

In block 304, electronic device 110 uses multi-level intermediate representation module 112 included therein to convert machine learning model 120 received in block 302 to an intermediate representation by means of a multi-level intermediate representation method. The specific content of this action involved in block 304 is the same as that involved in block 204, and will not be repeated here.

In block 306, electronic device 110 determines device types corresponding to multiple parts of a computation associated with machine learning model 120. According to an embodiment of the present disclosure, the device types corresponding to the multiple parts of the computation associated with machine learning model 120 may include at least one of the following: a central processing unit, a dedicated processing unit, and a dedicated accelerator such as a field programmable gate array and an application specific integrated circuit.

In block 308, based on types of multiple computing devices included in computing device 130 and the device types corresponding to the multiple parts of the computation associated with machine learning model 120 and determined in block 306, electronic device 110 deploys the multiple parts of the computation associated with machine learning model 120 to one or more of the multiple computing devices included in computing device 130. According to an embodiment of the present disclosure, the multiple parts of the computation associated with machine learning model 120 can be deployed by defining the form of an application programming interface for computation.

For example, when the device type of computing device 130 is a central processing unit device type, it means that there is no accelerator on computing device 130, so all computations will be scheduled on the central processing unit.

When this device type is a dedicated processing unit device type, the application programming interface defined for open neural network exchange module 111 includes the following situations: for computations that are suitable for execution on a dedicated processing unit, they can be linked to application programming interfaces, such as a cuDNN application programming interface, a cuBLAS application programming interface, or a Compute Unified Device Architecture (CUDA) application programming interface, that are suitable for a dedicated processing unit during the back-end code generation phase, where "cu" denotes CUDA, DNN denotes Deep Neural Network, and BLAS denotes Basic Linear Algebra Subprograms; or if such application programming interfaces are not available, functions such as CUDA functions can be generated for them so that these computations can be executed in a dedicated processing unit; and for computations that are not suitable for execution on a dedicated processing unit, they can be linked to libraries, such as General Matrix Multiply (GEMM) or Eigen, for a central processing unit during the back-end code generation phase. Or if such application programming interfaces are not available, central processing unit functions can be generated for them so that these computations can be executed in a central processing unit.

Where this device type is a dedicated accelerator device type such as a field programmable gate array and an application specific integrated circuit, in the back-end code generation phase, if the computations are implemented by a computing device, the computations can be linked to a library of devices provided by a provider of the dedicated accelerator; otherwise, central processing unit functions used for them can be generated.

In block 310, electronic device 110 acquires a computation graph associated with machine learning model 120. According to an embodiment of the present disclosure, the computation graph represents dependencies between multiple parts of the computation associated with machine learning model 120.

In block 312, electronic device 110 determines parameters associated with the multiple parts of the computation associated with machine learning model 120 based on the computation graph acquired in block 310 and the intermediate representation converted in block 304.

In block 314, electronic device 110 determines whether at least one parameter among the parameters determined in block 312 is associated with at least two of the multiple parts of the computation associated with machine learning model 120. When electronic device 110 determines that at least one of the parameters is associated with at least two of the multiple parts of the computation, method 300 proceeds to block 316; and when electronic device 110 determines that no parameter among the parameters is associated with at least two of the multiple parts of this computation, method 300 proceeds to block 318.

In block 316, electronic device 110 stores data associated with the at least one parameter for use by the at least two parts of the computation associated with machine learning model 120.

According to an embodiment of the present disclosure, the actions involved in blocks 312 to 316 relate to enabling data of parameters that can be used in all the multiple parts of the computation to be reusable by, for example, intelligently scheduling the parameters involved in the computation, which can be implemented, for example, in the following manner: first, the computation graph and machine learning model files are parsed and parameters are bound to each computation; then, computations are scheduled based on which parallelism algorithm is selected by a user, and if the user selects the default data parallelism, all computations are scheduled to local computing devices or computing nodes based on a target device specified by the user, a central processing unit, or the central processing unit and a specified accelerator; if the user selects pipelined parallelism, all computations are scheduled to the local computing devices or computing nodes together with all central processing unit kernels and/or all accelerators; and if the user selects model parallelism, all computations are scheduled to computing devices or computing nodes with a cluster of all central processing unit kernels and/or all accelerators; next, the parameters are scheduled, and if a computation has been scheduled to a central processing unit, a main memory is assigned for input parameters and a computation result of that computation, and parameters of that computation are copied to the main memory of the central processing unit; and if a computation has been scheduled to an accelerator, a device memory is assigned for input parameters and a computation result of that computation, and parameters of that computation are copied to the device memory.

In block 318, electronic device 110 executes in parallel the multiple parts of the computation associated with machine learning model 120 based on the computation graph acquired in block 310 and the intermediate representation converted in block 304. According to an embodiment of the present disclosure, if data associated with the at least one parameter is stored in block 316, when the input or output parameters need to be computed during the execution of the computation associated with machine learning model 120, a parameter assignment table that can be registered, for example, in the main memory or in the device memory can be first searched. If the parameters have been stored, the data associated with the parameters in the memory can be used directly, so that a part of parameters in common can be shared in computations for different input samples.

According to some embodiments of the present disclosure, the parallelism algorithm specifically adopted in block 318, for example, default data parallelism, pipelined parallelism, or model parallelism, may be determined in response to receiving a user instruction for parallel execution of the multiple parts of the computation associated with machine learning model 120. According to some other embodiments of the present disclosure, the parallelism algorithm specifically adopted in block 318 may be determined based on a pre-configuration regarding parallel execution.

According to an embodiment of the present disclosure, different parallelism algorithms may also be determined based on different schedulers implemented. For example, in order to implement different schedulers within the framework according to the present disclosure, a computation graph associated with machine learning model 120 that is acquired by electronic device 110 or specifically acquired for open neural network exchange module 111 as well as compiled binary files regarding all the computations may be based. These compiled binary files are based on the computing devices on which the computations are to be deployed, and based on the semantics and syntax defined for the computations in multi-level intermediate representation module 112.

In block 320, electronic device 110 determines whether a configuration of a computing device among the multiple computing devices included in computing device 130 has been changed. When electronic device 110 determines that a configuration of a computing device among the multiple computing devices included in computing device 130 has been changed, method 300 proceeds to block 322.

In block 322, electronic device 110 redeploys the computation associated with machine learning model 120 to the multiple computing devices included in computing device 130 based on the changed configuration determined in block 320.

According to an embodiment of the present disclosure, the actions involved in blocks 320 and 322 relate to the redeployment of the computation associated with machine learning model 120 among the multiple computing devices included in computing device 130 when a configuration of a computing device that has been deployed with the computation associated with machine learning model 120 changes due to a change in hardware or software, so as to achieve, based on the changed configuration, a more reasonable assignment of computations to be performed on various computing devices.

Figure 4:
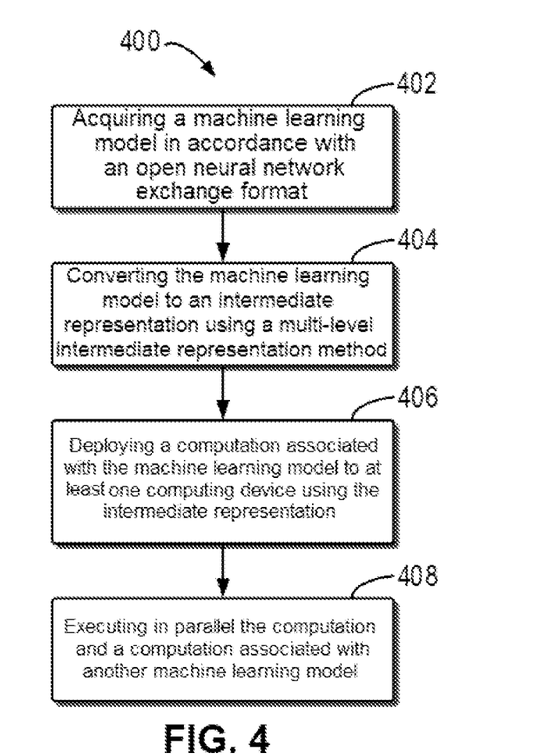
FIG. 4 illustrates a flowchart of method 400 for deploying a machine learning model according to an embodiment of the present disclosure.

FIG. 4 illustrates a flowchart of method 400 for deploying a machine learning model according to an embodiment of the present disclosure. Method 400 may also be implemented by electronic device 110 shown in FIG. 1 or by other appropriate devices. It should be understood that method 400 for deploying a machine learning model may also include additional steps not shown and/or may omit the steps shown, and the scope of the embodiments of the present disclosure is not limited in this regard. Method 400 for deploying a machine learning model is a specific implementation of method 200 for deploying a machine learning model.

In block 402, electronic device 110 uses open neural network exchange module 111 included therein to acquire machine learning model 120 in accordance with an open neural network exchange format. The specific content of this action involved in block 402 is the same as that involved in block 202, and will not be repeated here.

In block 404, electronic device 110 uses multi-level intermediate representation module 112 included therein to convert machine learning model 120 received in block 402 to an intermediate representation by means of a multi-level intermediate representation method. The specific content of this action involved in block 404 is the same as that involved in block 204, and will not be repeated here.

In block 406, electronic device 110 deploys a computation associated with machine learning model 120 to computing device 130 using the intermediate representation converted in block 404. The specific content of this action involved in block 406 is the same as that involved in block 206, and will not be repeated here.

In block 408, electronic device 110 executes in parallel the computation associated with machine learning model 120 and deployed in block 406 and a computation associated with another machine learning model. According to an embodiment of the present disclosure, the other machine learning model is acquired by electronic device 110 using open neural network exchange module 111 included therein and in accordance with the open neural network exchange format, and has been converted to another intermediate representation by electronic device 110 using multi-level intermediate representation module 112 included therein and utilizing the multi-level intermediate representation method, and the computation associated with the other machine learning model has been deployed to computing device 130 by electronic device 110 using the converted another intermediate representation.

By means of method 400 for deploying a machine learning model according to an embodiment of the present disclosure, the parallel execution, by at least one computing device, of multiple computations associated with multiple machine learning models 120 and deployed to the at least one computing device can be implemented.

Hereinbefore, with reference to FIGS. 1 to 4, related content has been described for example environment 100 in which devices and/or methods according to embodiments of the present disclosure may be implemented, including method 200 for deploying a machine learning model according to an embodiment of the present disclosure, method 300 for deploying a machine learning model according to an embodiment of the present disclosure, and method 400 for deploying a machine learning model according to an embodiment of the present disclosure. It should be understood that the above description is intended to illustrate the operation of example embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

Through the description above with reference to FIGS. 1 to 4, the technical solutions according to the embodiments of the present disclosure have many advantages over conventional solutions.

For example, with the technical solution of the present disclosure, an open and dynamic reasoning deep learning framework on edge nodes can be realized. Regarding the openness of the reasoning deep learning framework, the front end of the framework can accept all models from all frameworks, the back end can generate code for all target devices with or without a customized back end for dedicated devices, and a scheduler can be customized or selected by a user. Regarding the dynamic feature of the reasoning deep learning framework, once a hardware configuration of the edge nodes has changed, the back end of the framework can promptly and appropriately generate code for a computing device whose configuration has been changed, and the scheduler can be used to achieve the selection of different parallelizations at runtime.

With the technical solution of the present disclosure, the user only needs to provide a model and a framework from which the model was pre-trained, and then the framework can deploy it to any platform on any device. Meanwhile, the ability is also provided to work on a single edge node or across multiple edge nodes using pipelined parallelization and model parallelization of the model. In addition, by providing a dynamically pluggable scheduler in the framework, the user can dynamically change a default parallelization algorithm used in the framework. Further, all computations can be scheduled across different computing devices based on the characteristics of the computations so as to optimize the performance. Furthermore, it is possible to schedule the pre-trained parameters of all the models based on computational scheduling, thus making it possible to share these parameters between different computations and reasonings for different input samples, saving the cost of the movement of parameters and saving device memory at the same time.

With the technical solution of the present disclosure, using an open front end, the framework can accept models pre-trained by any framework to support as many client terminals as possible; using an open back end, the framework will support accelerators from a greater number of providers and will encourage more friendly competition among the providers so that the providers' operating costs during their hardware purchases can be reduced; using an open scheduler, the framework will allow heavier deep learning tasks to be customized to infrastructure configurations with higher performance, so that the providers' capital expenditures can also be reduced.

With the technical solution of the present disclosure, it is possible to allow the deployment of any machine learning model, to support the deployment of machine learning models to computing devices, and also to allow the deployment of heavier machine learning tasks to computing devices with higher performance, thereby enabling easy and reasonable deployment of machine learning models, which not only improves the efficiency and effectiveness of the deployment of machine learning models, but also helps improve the execution efficiency of computations of the machine learning models, thereby improving the user experience associated with the machine learning models.

Figure 5:
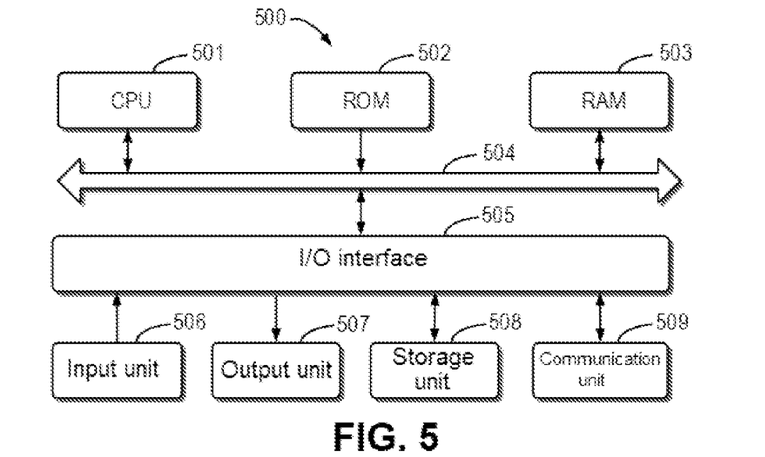
FIG. 5 illustrates a schematic block diagram of example device 500 that can be used to implement the embodiments of the present disclosure.

FIG. 5 illustrates a schematic block diagram of example device 500 that can be used to implement the embodiments of the present disclosure. According to the embodiments of the present disclosure, electronic device 110 in FIG. 1 may be implemented by device 500. As shown in the drawing, device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of storage device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, such as methods 200, 300, and 400, may be performed by CPU 501. For example, in some embodiments, methods 200, 300, and 400 may be implemented as a computer software program that is tangibly included in a machine-readable medium such as storage unit 508. In some embodiments, part or all of the computer program may be loaded and/or mounted to device 500 via ROM 502 and/or communication unit 509. One or more actions of methods 200, 300, and 400 described above may be performed when the computer program is loaded into RAM 503 and executed by CPU 501.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that can hold and store instructions used by an instruction execution device. The computer-readable storage medium may be, for example, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer can be connected to a user's computer through any kind of network, including a local area network (LAN) or a wide area network (WAN), or it can be connected to an external computer, for example, connected through an Internet using an Internet service provider. In some embodiments, an electronic circuit, for example, a programmable logic circuit, a field programmable gate array (FPGA), or a programmable logic array (PLA), is personalized by utilizing state information of the computer-readable program instructions, and the electronic circuit may execute computer-readable program instructions so as to implement various aspects of the embodiments of the present disclosure.

Various aspects of the embodiments of the present disclosure are described herein with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations will be apparent to those of ordinary skill in the art without departing from the scope and spirit of the illustrated embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method comprising:

acquiring, in a front end of a compiler executing on at least one processing unit coupled to at least one memory, a machine learning model in accordance with an open neural network exchange format;

converting, in a back end of the compiler, the machine learning model from the open neural network exchange format to an intermediate representation using a multi-level intermediate representation method, the intermediate representation having a plurality of distinct levels including at least a first level comprising a first representation format having associated therewith a first compiler utility of the back end of the compiler, and a second level comprising a second representation format different than the first representation format and having associated therewith a second compiler utility of the back end of the compiler, different than the first compiler utility;

generating, in the back end of the compiler, first hardware-specific code from the first level of the intermediate representation for a first device type, the first hardware-specific code being generated utilizing the first compiler utility and being configured in accordance with a first parallelism algorithm implemented by a first scheduler for parallel performance of computations of the first hardware-specific code, the first parallelism algorithm providing one of data parallelism, model parallelism and pipelined parallelism;

generating, in the back end of the compiler, second hardware-specific code from the second level of the intermediate representation for a second device type different than the first device type, the second hardware-specific code being generated utilizing the second compiler utility and being configured in accordance with a second parallelism algorithm, different than the first parallelism algorithm, implemented by a second scheduler, different than the first scheduler, for parallel performance of computations of the second hardware-specific code, the second parallelism algorithm providing a different one of the data parallelism, model parallelism and pipelined parallelism than that provided by the first parallelism algorithm;

deploying a computation associated with the machine learning model to at least one computing device using the intermediate representation;

wherein deploying the computation comprises:

linking the first hardware-specific code to a first application programming interface associated with a first neural network architecture;

linking the second hardware-specific code to a second application programming interface associated with a second neural network architecture different than the first neural network architecture;

executing the first hardware-specific code generated for the first device type on a first computing device having the first device type, via the first application programming interface; and executing the second hardware-specific code generated for the second device type on a second computing device having the second device type, via the second application programming interface;

automatically detecting a change in a hardware configuration of at least one of the first computing device having the first device type and the second computing device having the second device type; and regenerating, in the back end of the compiler, at least one of the first hardware-specific code and the second hardware-specific code, responsive to the automatically detected change, for execution utilizing the changed hardware configuration.

2. The method according to claim 1, further including:

acquiring a computation graph associated with the machine learning model, wherein the computation graph represents dependencies between multiple parts of the computation associated with the machine learning model; and executing in parallel the multiple parts of the computation based on the computation graph and the intermediate representation.

3. The method according to claim 2, further including:

determining parameters associated with the multiple parts of the computation based on the computation graph and the intermediate representation; and storing, if it is determined that at least one of the parameters is associated with at least two of the multiple parts, data associated with the at least one parameter for use by the at least two parts of the computation.

4. The method according to claim 2, wherein executing in parallel the multiple parts includes:

executing in parallel the multiple parts in response to receiving a user instruction for parallel execution of the multiple parts; or executing in parallel the multiple parts based on a pre-configuration regarding parallel execution.

5. The method according to claim 1, further including:

executing in parallel the computation and a computation associated with another machine learning model, wherein the other machine learning model is acquired in accordance with the open neural network exchange format and has been converted to another intermediate representation using the multi-level intermediate representation method, and the computation associated with the other machine learning model has been deployed to the at least one computing device using the other intermediate representation.

6. The method according to claim 1, wherein the at least one computing device includes multiple computing devices, and deploying the computation associated with the machine learning model to the at least one computing device includes:

determining device types corresponding to multiple parts of the computation associated with the machine learning model; and deploying the multiple parts of the computation to one or more of the multiple computing devices based on types of the multiple computing devices and the determined device types.

7. The method according to claim 1, wherein the at least one computing device includes at least one of the following:

a central processing unit; and a dedicated processing unit.

8. The method according to claim 1, wherein the at least one computing device includes multiple computing devices, and the method further includes:

redeploying, if a configuration of one of the multiple computing devices is changed, the computation to the multiple computing devices based on the changed configuration.

9. An electronic device, including:

at least one processing unit; and at least one memory which is coupled to the at least one processing unit and stores instructions for execution by the at least one processing unit, wherein the instructions, when executed by the at least one processing unit, cause the electronic device to perform actions comprising:

acquiring, in a front end of a compiler executing on the at least one processing unit coupled to the at least one memory, a machine learning model in accordance with an open neural network exchange format;

converting, in a back end of the compiler, the machine learning model from the open neural network exchange format to an intermediate representation using a multi-level intermediate representation method, the intermediate representation having a plurality of distinct levels including at least a first level comprising a first representation format having associated therewith a first compiler utility of the back end of the compiler, and a second level comprising a second representation format different than the first representation format and having associated therewith a second compiler utility of the back end of the compiler, different than the first compiler utility;

generating, in the back end of the compiler, first hardware-specific code from the first level of the intermediate representation for a first device type, the first hardware-specific code being generated utilizing the first compiler utility and being configured in accordance with a first parallelism algorithm implemented by a first scheduler for parallel performance of computations of the first hardware-specific code, the first parallelism algorithm providing one of data parallelism, model parallelism and pipelined parallelism;

generating, in the back end of the compiler, second hardware-specific code from the second level of the intermediate representation for a second device type different than the first device type, the second hardware-specific code being generated utilizing the second compiler utility and being configured in accordance with a second parallelism algorithm, different than the first parallelism algorithm, implemented by a second scheduler, different than the first scheduler, for parallel performance of computations of the second hardware-specific code, the second parallelism algorithm providing a different one of the data parallelism, model parallelism and pipelined parallelism than that provided by the first parallelism algorithm;

deploying a computation associated with the machine learning model to at least one computing device using the intermediate representation;

wherein deploying the computation comprises:

linking the first hardware-specific code to a first application programming interface associated with a first neural network architecture;

linking the second hardware-specific code to a second application programming interface associated with a second neural network architecture different than the first neural network architecture;

executing the first hardware-specific code generated for the first device type on a first computing device having the first device type, via the first application programming interface; and executing the second hardware-specific code generated for the second device type on a second computing device having the second device type, via the second application programming interface;

automatically detecting a change in a hardware configuration of at least one of the first computing device having the first device type and the second computing device having the second device type; and regenerating, in the back end of the compiler, at least one of the first hardware-specific code and the second hardware-specific code, responsive to the automatically detected change, for execution utilizing the changed hardware configuration.

10. The electronic device according to claim 9, wherein the actions further include:

acquiring a computation graph associated with the machine learning model, wherein the computation graph represents dependencies between multiple parts of the computation associated with the machine learning model; and executing in parallel the multiple parts of the computation based on the computation graph and the intermediate representation.

11. The electronic device according to claim 10, wherein the actions further include:

determining parameters associated with the multiple parts of the computation based on the computation graph and the intermediate representation; and storing, if it is determined that at least one of the parameters is associated with at least two of the multiple parts, data associated with the at least one parameter for use by the at least two parts of the computation.

12. The electronic device according to claim 10, wherein executing in parallel the multiple parts includes:

executing in parallel the multiple parts in response to receiving a user instruction for parallel execution of the multiple parts; or executing in parallel the multiple parts based on a pre-configuration regarding parallel execution.

13. The electronic device according to claim 9, wherein the actions further include:

executing in parallel the computation and a computation associated with another machine learning model, wherein the other machine learning model is acquired in accordance with the open neural network exchange format and has been converted to another intermediate representation using the multi-level intermediate representation method, and the computation associated with the other machine learning model has been deployed to the at least one computing device using the other intermediate representation.

14. The electronic device according to claim 9, wherein the at least one computing device includes multiple computing devices, and deploying the computation associated with the machine learning model to the at least one computing device includes:

determining device types corresponding to multiple parts of the computation associated with the machine learning model; and deploying the multiple parts of the computation to one or more of the multiple computing devices based on types of the multiple computing devices and the determined device types.

15. The electronic device according to claim 9, wherein the at least one computing device includes at least one of the following:

a central processing unit; and a dedicated processing unit.

16. The electronic device according to claim 9, wherein the at least one computing device includes multiple computing devices, and the actions further include:

redeploying, if a configuration of one of the multiple computing devices is changed, the computation to the multiple computing devices based on the changed configuration.

17. A computer program product tangibly stored on a non-transitory computer-readable medium and including machine-executable instructions, wherein the machine-executable instructions, when executed by a machine, cause the machine to perform actions comprising:

acquiring, in a front end of a compiler executing on at least one processing unit coupled to at least one memory, a machine learning model in accordance with an open neural network exchange format;

converting, in a back end of the compiler, the machine learning model from the open neural network exchange format to an intermediate representation using a multi-level intermediate representation method, the intermediate representation having a plurality of distinct levels including at least a first level comprising a first representation format having associated therewith a first compiler utility of the back end of the compiler, and a second level comprising a second representation format different than the first representation format and having associated therewith a second compiler utility of the back end of the compiler, different than the first compiler utility;

generating, in the back end of the compiler, first hardware-specific code from the first level of the intermediate representation for a first device type, the first hardware-specific code being generated utilizing the first compiler utility and being configured in accordance with a first parallelism algorithm implemented by a first scheduler for parallel performance of computations of the first hardware-specific code, the first parallelism algorithm providing one of data parallelism, model parallelism and pipelined parallelism;

generating, in the back end of the compiler, second hardware-specific code from the second level of the intermediate representation for a second device type different than the first device type, the second hardware-specific code being generated utilizing the second compiler utility and being configured in accordance with a second parallelism algorithm, different than the first parallelism algorithm, implemented by a second scheduler, different than the first scheduler, for parallel performance of computations of the second hardware-specific code, the second parallelism algorithm providing a different one of the data parallelism, model parallelism and pipelined parallelism than that provided by the first parallelism algorithm;

deploying a computation associated with the machine learning model to at least one computing device using the intermediate representation;

wherein deploying the computation comprises:

linking the first hardware-specific code to a first application programming interface associated with a first neural network architecture;

linking the second hardware-specific code to a second application programming interface associated with a second neural network architecture different than the first neural network architecture;

executing the first hardware-specific code generated for the first device type on a first computing device having the first device type, via the first application programming interface; and executing the second hardware-specific code generated for the second device type on a second computing device having the second device type, via the second application programming interface;

automatically detecting a change in a hardware configuration of at least one of the first computing device having the first device type and the second computing device having the second device type; and regenerating, in the back end of the compiler, at least one of the first hardware-specific code and the second hardware-specific code, responsive to the automatically detected change, for execution utilizing the changed hardware configuration.

18. The computer program product according to claim 17, further including:

acquiring a computation graph associated with the machine learning model, wherein the computation graph represents dependencies between multiple parts of the computation associated with the machine learning model; and executing in parallel the multiple parts of the computation based on the computation graph and the intermediate representation.

19. The computer program product according to claim 18, further including:

determining parameters associated with the multiple parts of the computation based on the computation graph and the intermediate representation; and storing, if it is determined that at least one of the parameters is associated with at least two of the multiple parts, data associated with the at least one parameter for use by the at least two parts of the computation.

20. The computer program product according to claim 18, wherein executing in parallel the multiple parts includes:

executing in parallel the multiple parts in response to receiving a user instruction for parallel execution of the multiple parts; or executing in parallel the multiple parts based on a preconfiguration regarding parallel execution.

* * * * *